US009562568B2

(12) United States Patent
Newberry

(10) Patent No.: US 9,562,568 B2
(45) Date of Patent: Feb. 7, 2017

(54) DEVICE FOR HOLDING A BEARING MEMBER RELATIVE TO A FIXED BODY

(71) Applicant: AGUSTAWESTLAND LIMITED, Somerset (GB)

(72) Inventor: Paul Terrence Newberry, Somerset (GB)

(73) Assignee: AGUSTAWESTLAND LIMITED, Somerset (GB)

( * ) Notice: Subject to any disclaimer, the term of this patent is extended or adjusted under 35 U.S.C. 154(b) by 0 days.

(21) Appl. No.: 14/771,050

(22) PCT Filed: Feb. 25, 2014

(86) PCT No.: PCT/GB2014/050561
§ 371 (c)(1),
(2) Date: Aug. 27, 2015

(87) PCT Pub. No.: WO2014/135845
PCT Pub. Date: Sep. 12, 2014

(65) Prior Publication Data
US 2016/0010695 A1  Jan. 14, 2016

(30) Foreign Application Priority Data

Mar. 8, 2013  (GB) .................................. 1304246.0

(51) Int. Cl.
*F16C 43/04*       (2006.01)
*F16C 35/067*      (2006.01)
(Continued)

(52) U.S. Cl.
CPC ........... *F16C 35/067* (2013.01); *F16B 1/0071* (2013.01); *F16B 9/023* (2013.01); *F16B 19/002* (2013.01);
(Continued)

(58) Field of Classification Search
CPC ....... F16C 19/52; F16C 33/586; F16C 35/067; F16C 41/008; F16C 2226/60; F16C 2226/62; F16C 2233/00; F16B 1/0071; F16B 9/023; F16B 9/026; F16B 19/002; F16B 19/109; F16B 21/065; F16B 21/08; F16B 35/00; F16B 35/005; F16B 35/041; F16B 41/005; F16B 2019/006
(Continued)

(56) References Cited

U.S. PATENT DOCUMENTS 4,930,371 A * 6/1990 Schneider ............... F02B 75/06
123/198 R
5,586,852 A * 12/1996 Ganter .................... F16B 21/12
411/349

(Continued)

FOREIGN PATENT DOCUMENTS

DE        10236618     2/2004
DE       102007049049  2/2010
GB        23274471     1/1999

OTHER PUBLICATIONS

UK, Intellectual Property Office—Search Report in GB1304246.0 dated Jul. 11, 2013.

*Primary Examiner* — James Pilkington
(74) *Attorney, Agent, or Firm* — Morgan, Lewis & Bockius LLP

(57) ABSTRACT

A device for holding a bearing member relative to a fixed body, including a first part having a formation for engagement with a corresponding formation on a fixed body to hold the first part relative to the fixed body, and a receiving formation for receiving and slidably supporting a generally elongate second part, wherein a first end of the second part is configured for engagement with a part of a bearing member to hold the bearing member relative to the fixed body, and wherein a second, opposite, end of the second part
(Continued)

supports an abutment member which prevents the first and second parts separating from each other, wherein the device includes biasing means for biasing the first end of the second part away from the first part.

21 Claims, 4 Drawing Sheets

(51) Int. Cl.
    *F16B 1/00*      (2006.01)
    *F16B 9/02*      (2006.01)
    *F16B 41/00*      (2006.01)
    *F16B 19/00*      (2006.01)
    *F16C 33/58*      (2006.01)
    *F16B 19/10*      (2006.01)
    *F16B 21/06*      (2006.01)

(52) U.S. Cl.
    CPC ........... *F16B 41/005* (2013.01); *F16C 33/586* (2013.01); *F16B 19/109* (2013.01); *F16B 21/065* (2013.01); *F16B 2019/006* (2013.01); *F16C 2226/62* (2013.01)

(58) Field of Classification Search
    USPC .......................................... 411/347, 383, 393
    See application file for complete search history.

(56) References Cited

U.S. PATENT DOCUMENTS

| | | | |
|---|---|---|---|
| 6,234,735 B1* | 5/2001 | Ganter | F16B 5/0233 |
| | | | 411/353 |
| 8,075,196 B2* | 12/2011 | Burner | F16C 19/386 |
| | | | 384/206 |
| 2008/0289841 A1 | 11/2008 | Kang | |
| 2012/0099943 A1* | 4/2012 | Chiu | F16B 5/0208 |
| | | | 411/347 |

\* cited by examiner

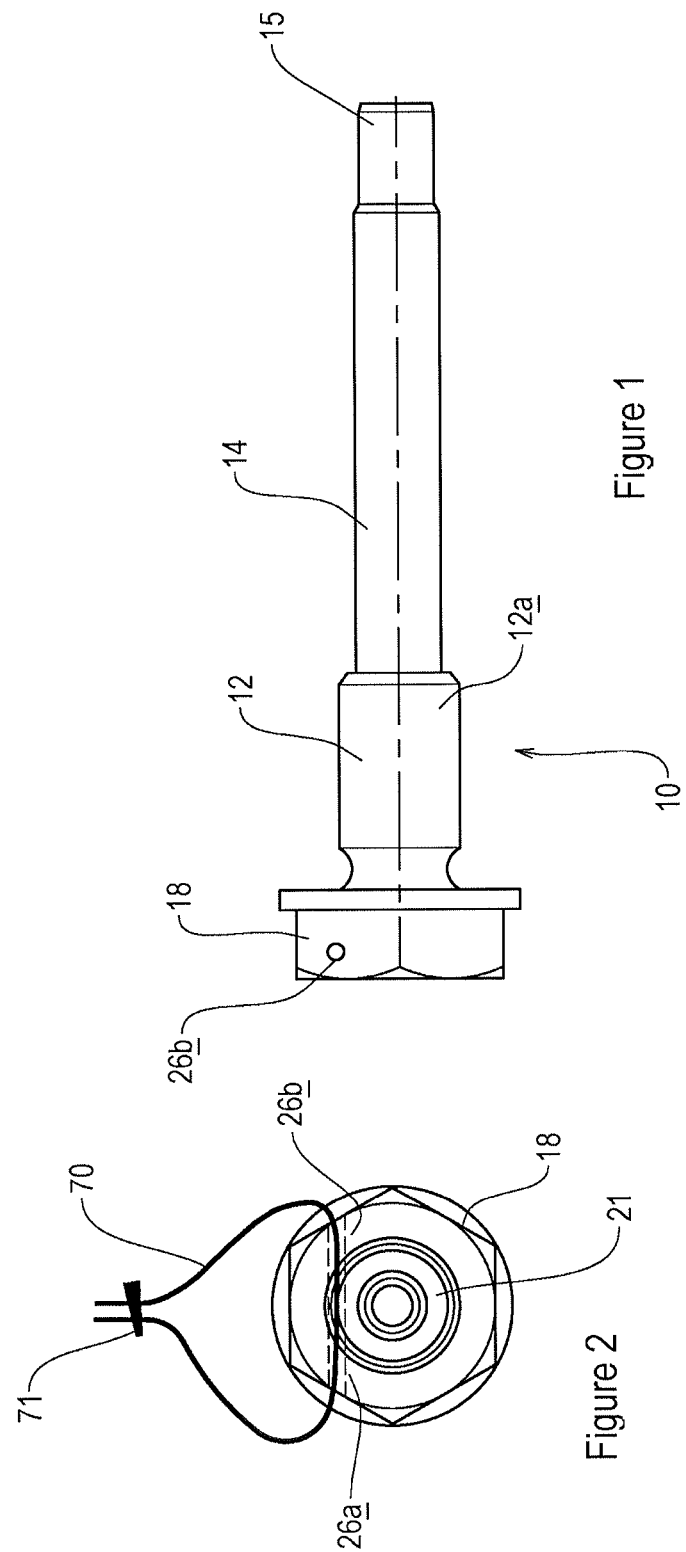

DEVICE FOR HOLDING A BEARING MEMBER RELATIVE TO A FIXED BODY

SUMMARY OF THE INVENTION

The invention relates to a device for holding a bearing member relative to a fixed body. In particular, but not exclusively, the invention relates to a device intended to be used for holding a bearing member, which supports a rotatable shaft (e.g. a prop shaft), relative a chassis of the vehicle. In particular, but again not exclusively, the invention has been devised for an aircraft, particularly a helicopter.

In the helicopter field, prior art devices exist for holding such a bearing member relative to such a fixed body. These typically take the form of a threaded bolt which is engaged with a thread bore in the fixed body, with an end of the bolt engaging in a recess of the bearing member, so as to locate the latter. However, it is not possible for a user to determine visually whether the end of the bolt is properly engaged with the recess in the bearing member. In addition, misalignment can easily occur, which can result in the end of the bolt causing damage to the bearing member. It is therefore an object of the invention to address these problems.

According to a first aspect of the invention, we provide a device for holding a bearing member relative to a fixed body, including:
  a first part having an formation for engagement with a corresponding formation on a fixed body to hold the first part relative to the fixed body, and a receiving formation for receiving and slidably supporting a generally elongate second part,
  wherein a first end of the second part is configured for engagement with a part of a bearing member to hold the bearing member relative to the fixed body, and wherein a second, opposite, end of the second part supports an abutment member which prevents the first and second parts separating from each other,
  wherein the device includes biasing means for biasing the first end of the second part away from the first part.

According to a second aspect of the invention, we provide a system including:
  a fixed body;
  a bearing member positioned in a formation in the fixed body, the bearing member including an inner race, an outer race and a plurality of moveable bearing parts positioned therebetween, wherein the outer race includes a recess; and
  a device according to the first aspect of the invention, wherein the engagement formation on the first part of the device is engaged with a corresponding formation on a fixed body so as to hold the first part relative to the fixed body, and wherein the first end of the second part of the device is positioned in the recess in the an outer race of the bearing member so as to hold the bearing member relative to the fixed body.

BRIEF DESCRIPTION OF THE DRAWINGS

Embodiments of the invention will now be described by way of example only with reference to the accompanying drawings, of which:

FIG. 1 is a side view of a first embodiment of a device in accordance with the first aspect of the present invention.

FIG. 2 is an end view of the device of FIG. 1;

DETAILED DESCRIPTION OF THE INVENTION

Figure 3:
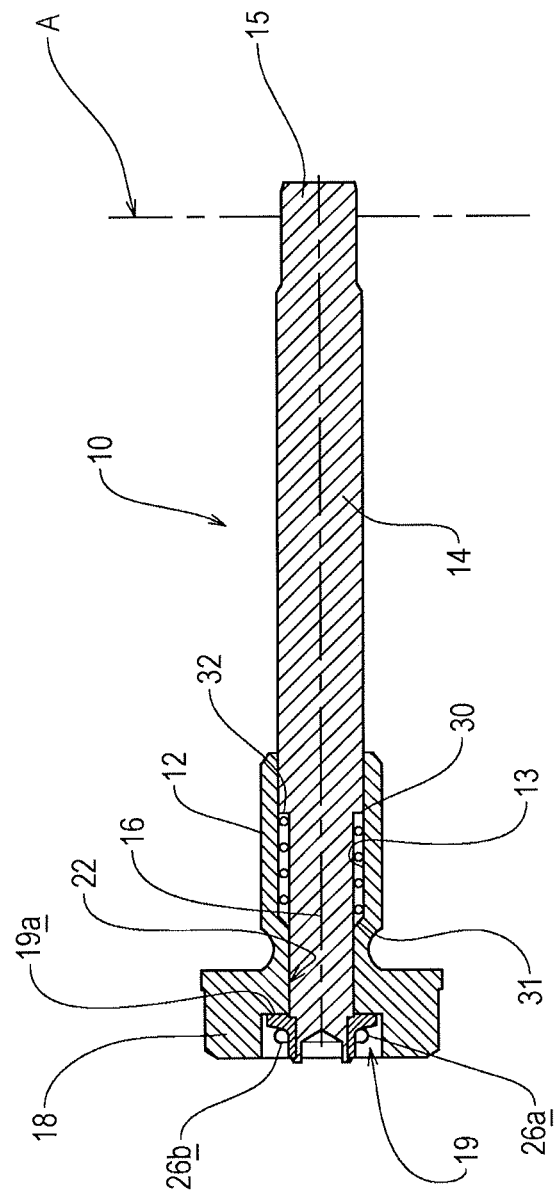
FIG. 3 is a cross-sectional view of the device of FIG. 1 with a first part thereof in an extended condition.

Referring to FIGS. 1 to 4, these show a device 10 for holding a bearing member relative to a fixed body. The device 10 is to be used as part of a system 100 (see FIG. 5) for holding a ball bearing 50 relative to a chassis 60 of a helicopter (not shown).

The device 10 includes a first 12 and second 14 parts which are connected to each other as described below. The first and second parts together form a bolt-shaped member which serves two purposes; 1) to locate the bearing member; and 2) to indicate whether the bearing is misaligned. The first part 12 has a formation, generally indicated at 12*a* which is threaded (although the thread is not shown) for engaging with a corresponding threaded formation 54 (see FIG. 5) on the chassis 60. The threaded formations ensure that the first part 12 of the device is held relative to the fixed body. The first part 12 also includes an axially extending receiving formation 13 (see FIGS. 3 and 4) for receiving and slidably supporting the generally elongate second part 14.

A first free end 15 of the second part 14 is configured for engagement with a part 55 (see FIG. 5) of the bearing member 50 to hold the bearing member 50 relative to the chassis 60 so that its outer race cannot rotate. An opposite end 16 of the second part 14 passes through an axial bore 22 in the first part 12 and its remote end supports an abutment member 21 (which will be described in more detail later). The purpose of the abutment member 21 is to prevent the first and second parts 12, 14 separating from each other.

The device 10 includes biasing means in the form of a spring 30 for biasing the first end 15 of the second part 14 away from the first part 12. In the present embodiment the spring 30 is positioned completely within a respective axial bore 13 in the first part 12, which axial bore 13 communicates with the axial bore 22. The spring 30 is configured such that one end thereof abuts a shoulder 31 provided at the connection between the bores 13, 22 and an opposite end of the spring abuts a circumferential shoulder 32 provided on the second part 14.

An end of the first part 12 remote from the free end 15 of the second part 14 is provided with a formation 18 for engagement with a tool so that a user can effect rotation of the first part about its axis. The tool engagement formation in the present example is hexagon-shaped in end view (see FIG. 2) and includes a recess 19 to receive the abutment member 21. The recess 19 has a shoulder 19*a* with which the abutment member 21 engages so as to prevent the first and second parts 12, 14 separating from each other.

In more detail, the abutment member 21 in the present example includes a circumferentially extending flange to provide a surface which engages with the shoulder 19*a* in the recess 19. The circumferentially extending flange is connected to the remote end of the second end 16 of the second part 14 by any suitable means, e.g. by a threaded formation or by welding/adhesive.

As can be seen in the Figures, the first part 12 includes a pair of apertures 26*a*, 26*b* which in the present example are provided such that they extend transversely through the tool engagement of formation 18. Both apertures 26*a*, 26*b* communicate with the recess 19 and provide a means for securing an indicator member 70 to the device 10. Whilst in the present example a pair of apertures 26a, 26b are shown, it is possible to provide a single aperture extending through the tool engagement formation with which a respective indicator member can be engaged.

As seen in FIG. 2, the indicator member, which in the present example is a flexible element 70, for example a metal wire, extends through the apertures 26a, 26b and over a portion of the flange part of the abutment member 21, thus preventing the abutment member 21 from moving completely out of the recess 19. Free ends of the indicating member 70 are attached to each other by appropriate means at 71. The purpose of the indicator member 70 is to provide a tamper/movement evident means for visual assessment by a user.

Figure 5:
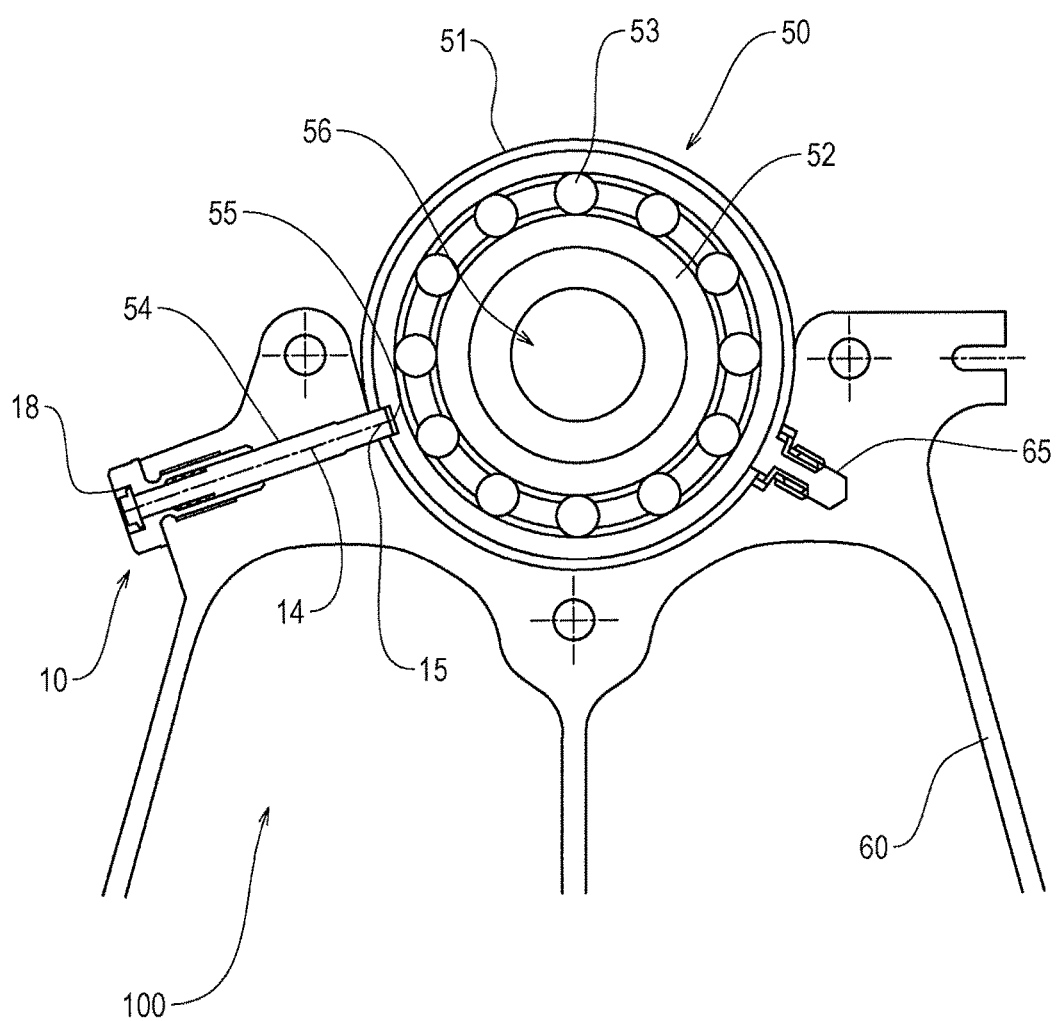
FIG. 5 is an end view of a system in accordance with the second aspect of the present invention.

Referring particularly to FIG. 5 it can be seen that the bearing member 50 includes an outer race 51, and inner race 52 and a plurality of ball bearings 53 positioned therebetween. The bearing member 50 is provided to support rotation of a shaft (not shown) which extends through a central aperture 56 in the bearing member 50.

The outer race 51 of the bearing member 50 includes the recess 55 which is intended to receive the free end 15 of the second part 14, in order to hold the bearing member relative to the fixed body 60 so as to prevent a rotation thereof. It can be seen that the fixed body 60 includes a bore 54, the entrance to which is threaded and of a slightly large diameter than the remainder, in order to engage with the thread 12a of the first part 12 of the device 10. Once engaged therewith, the second part extends 14 extends through the remainder of the bore 54 and into the recess 55 in the outer race 51 of the bearing member 50.

If the free end 15 is properly aligned with the recess 55, a user can determine this simply by looking at the position of the abutment member 21 in the recess 19. If the abutment member 21 is not fully received in the recess 19, then it can be deduced that the free end 15 is not properly aligned with the recess 55. If the end 15 is not fully received in the recess 55, then it will be urged towards the first part 12, with the spring 30 being compressed thus moving the abutment member 21 out of, or substantially towards the end of, the recess 19.

If the end 15 is properly received in the recess 55 then the spring is not compressed and thus the abutment member 21 moves to the bottom of the recess 19. When in this position, the indicator member 70 can be inspected, so any movement of the abutment member can easily be noticed, e.g. by breaking or movement of the indicator member 70.

Figure 4:
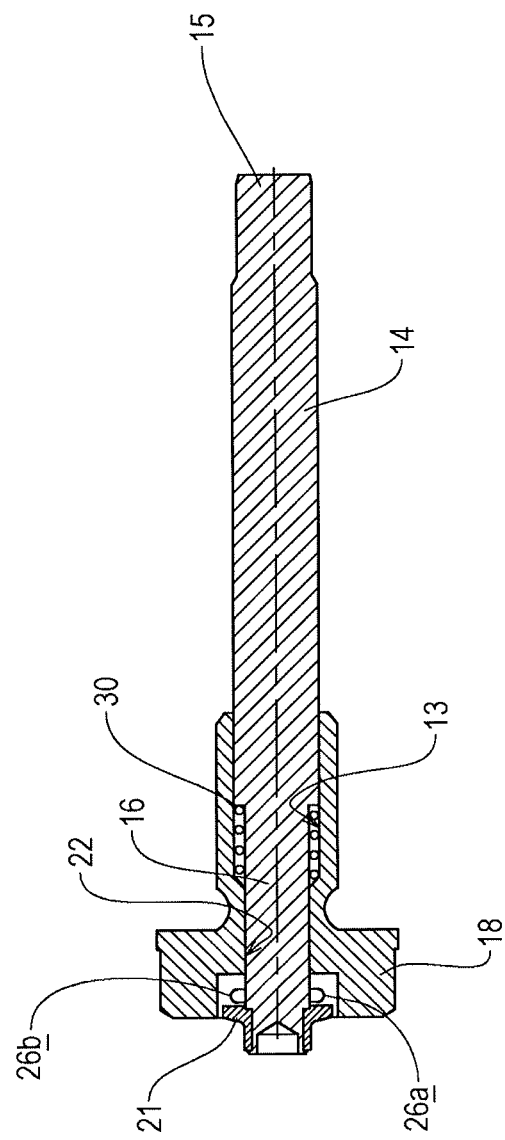
FIG. 4 is a cross-sectional view of the device of FIG. 1 with a first part thereof in a depressed condition.

In FIG. 3, the line indicated at A indicates the position of the end part 15 as shown in FIG. 4, i.e. when the spring has been compressed due to 15 misalignment.

It should of course be appreciated that various modifications can be made to the above embodiment without departing from the scope of the present invention. In particular, the indicator means may be provided in any suitable form so long as it can be passed through the aperture or apertures provided in the first part 12 of the device. In particular, a linear elongate member could be used. It should of course be appreciated that the tool formation part 18 can be any other appropriate shape so long as that it permits a user to engage an appropriate tool therewith to effect rotation of a first part 12 about its axis.

It should also be appreciated that any suitable biasing means could be used in place of the spring 30, for example, a resilient element such as a rubber or rubber like material.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realizing the invention in diverse forms thereof.

The invention claimed is:

1. A device for holding a bearing member relative to a fixed body, including:
   a first part having a first formation for engagement with a corresponding second formation provided on a fixed body to hold the first part relative to said fixed body, and a receiving formation for receiving and slidably supporting a generally elongate second part,
   wherein a first end of the second part is configured for engagement with a part of said bearing member to hold said bearing member relative to the fixed body, and wherein a second, opposite, end of the second part supports an abutment member which prevents the first and second parts separating from each other,
   wherein the device includes a spring for biasing the first end of the second part away from the first part, wherein the first part includes a third formation for engagement with a tool so as to effect rotation of the first part about its longitudinal axis, and wherein the tool engagement formation includes a recess to receive the abutment member.

2. The device of claim 1 further comprising an indicator member for indicating the relative position of the first and second parts of the device.

3. The device of claim 2 wherein the indicator member is provided by the abutment member and its position relative to the first part.

4. The device of claim 1 wherein the first formation for engagement on the first part is a thread.

5. The device of claim 1 wherein the spring is contained within the receiving formation of the first part.

6. The device of claim 5 wherein the spring acts at one end on a shoulder provided in the receiving formation in the first part and at an opposite end on a shoulder provided on the elongate second part.

7. The device of claim 1 wherein the recess has a shoulder with which the abutment member engages to prevent the first and second parts separating from each other.

8. The device of claim 7 wherein the abutment member includes a circumferentially extending flange, a surface of which engages with the shoulder in the recess.

9. The device of claim 1 wherein the first part includes an aperture which extends generally transversely to the longitudinal axis of the first part.

10. The device of claim 9 wherein the aperture communicates with the recess in the tool engagement formation.

11. The device of claim 9 wherein the device further comprises an indicator member which extends through the aperture.

12. The device of claim 11 wherein the indicator member extends through the aperture and prevents movement of the abutment member.

13. The device of claim 11 wherein the indicator member prevents movement of the abutment member in a direction away from the first part.

14. The device of claim 1 wherein the first part includes a pair of apertures each of which extends generally transversely to the longitudinal axis of the first part.

15. The device of claim 14 wherein the apertures communicate with the recess in the tool engagement formation.

16. The device of claim 14 wherein the device further comprises an indicator member which extends through the apertures.

17. The device of claim 16 wherein the indicator member extends through the apertures and prevents movement of the abutment member.

18. The device of claim 16 wherein the indicator member prevents movement of the abutment member in a direction away from the first part.

19. A system including:
   a fixed body;
   a bearing member positioned in a formation in the fixed body, the bearing member including an inner race, an outer race and a plurality of moveable bearing parts positioned there between, wherein the outer race includes a recess; and
   a device for holding the bearing member relative to the fixed body, including:
a first part having a first formation for engagement with a corresponding second formation provided on a fixed body to hold the first part relative to said fixed body, and a receiving formation for receiving and slidably supporting a generally elongate second part,
wherein a first end of the second part is configured for engagement with a part of said bearing member to hold said bearing member relative to the fixed body, and wherein a second, opposite, end of the second part supports an abutment member which prevents the first and second parts separating from each other,
wherein the device includes a spring for biasing the first end of the second part away from the first part, wherein the first part includes a third formation for engagement with a tool so as to effect rotation of the first part about its longitudinal axis, and wherein the tool engagement formation includes a recess to receive the abutment member; and
wherein the engagement formation on the first part of the device is engaged with the corresponding formation on the fixed body so as to hold the first part relative to the fixed body, and wherein the first end of the second part of the device is positioned in the recess in the outer race of the bearing member so as to hold the bearing member relative to the fixed body.

20. The system of claim 19 further comprising an indicator member for indicating the relative position of the first and second parts of the device.

21. The system of claim 20 wherein the indicator member is a flexible element.

* * * * *